(12) United States Patent
Chou (10) Patent No.: US 7,204,882 B2
(45) Date of Patent: Apr. 17, 2007

(54) POLYURETHANE RESIN COATING DEVICE (76) Inventor: Lung-Wen Chou, No. 20, Lane 256, Haiwei Rd., Longjing Township, Taichung County 434 (TW)

( * ) Notice: Subject to any disclaimer, the term of this patent is extended or adjusted under 35 U.S.C. 154(b) by 0 days.

(21) Appl. No.: 11/033,290

(22) Filed: Jan. 12, 2005

(65) Prior Publication Data

US 2006/0150898 A1    Jul. 13, 2006

(51) Int. Cl.
*B05C 1/08* (2006.01)
*B32B 37/00* (2006.01)
*B29C 65/00* (2006.01)

(52) U.S. Cl. .................. 118/259; 118/263; 118/304; 425/382.3; 156/578

(58) Field of Classification Search ............ 118/612, 118/259, 263, 304; 427/428.19, 207.1; 425/382.3, 425/363; 156/578
See application file for complete search history.

(56) References Cited

U.S. PATENT DOCUMENTS 2,557,841 A * 6/1951 Preusser .................. 366/137
3,398,014 A * 8/1968 Turner ..................... 427/208.4
4,501,498 A * 2/1985 McKelvey ................. 366/69
4,552,778 A * 11/1985 Zimmer ..................... 427/445
4,879,967 A * 11/1989 Sengoku .................... 118/259
5,747,107 A * 5/1998 Bayer et al. ............. 427/208.4
5,927,200 A * 7/1999 Chou et al. ................ 101/364
6,402,498 B1 * 6/2002 Dunn ......................... 425/224

* cited by examiner

*Primary Examiner*—Laura Edwards
(74) *Attorney, Agent, or Firm*—Troxell Law Office, PLLC (57) ABSTRACT

A polyurethane resin coating device includes a material mixing unit for mixing materials to have them reacted to form polyurethane resin liquid mixture. Subsequently, the polyurethane resin liquid mixture flows downward to a pressuring and sending unit to be mixed and reacted again by the helical rods rotating in the pressuring and sending unit and then pressured and conveyed to a gear pump. Afterward, the polyurethane resin liquid mixture is controlled by the rotating speed of the gears in the gear pump and steadily conveyed onto a coating wheel. A gap adjustable in size is formed between the wheel surface of the coating wheel and the outlet of the gear pump, able to carry out coating steadily and evenly.

8 Claims, 6 Drawing Sheets

POLYURETHANE RESIN COATING DEVICE

BACKGROUND OF THE INVENTION

1. Field of the Invention

This invention relates to a polyurethane resin coating device, particularly to one able to carry out coating of polyurethane resin steadily and evenly and control coating thickness and having a function of forming grain on a polyurethane resin layer.

2. Description of the Prior Art

Generally, the liquid mixture of polyurethane (PU) resin formed through mixing and reacting can be coated on a substratum cloth to form a resin membrane or coated on separable paper by means of dipping or coating equipment. Subsequently, the resin membrane is pasted thereon with a skin membrane and then the separable paper is peeled off to form a resin membrane pasted with a skin membrane, which can be made into various kinds of products for different uses.

However, the conventional coating device is to have the liquid mixture of polyurethane resin directly pressured and coated on the substratum cloth or separable paper only by a helical rod positioned in an pressuring device without aid of other similar devices. Therefore, the force for pressuring the liquid mixture of polyurethane resin outward is in sufficient and consequently the coating amount of the liquid mixture of polyurethane resin can hardly be controlled steadily and it is difficult to make resin layers with a same thickness. Further, since the conventional coating device cannot control coating amount, it is impossible to quickly adjust the coating device for producing resin membranes of different thicknesses required. Furthermore, the conventional coating equipment is unable to produce resin layers with dot shapes or grain, limited in use and effect.

SUMMARY OF THE INVENTION

The objective of the invention is to offer a polyurethane resin coating device including a material mixing unit to have material mixed and reacted to form polyurethane resin liquid mixture. Subsequently, the polyurethane resin liquid mixture flows downward to an extruding unit to be mixed and reacted again by the helical rods rotating in the extruding unit and then extruded and conveyed to a gear pump to be controlled by the rotating speed of gears inside the gear pump and steadily conveyed onto a coating wheel. Between the wheel surface and the outlet of the gear pump is formed a gap having a gap, which can not only carry out coating steadily and evenly, but also can be adjusted in its size to control a coating thickness of polyurethane resin. In addition, the coating wheel has its surface carved with solid grain, able to form grain on a polyurethane resin layer.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
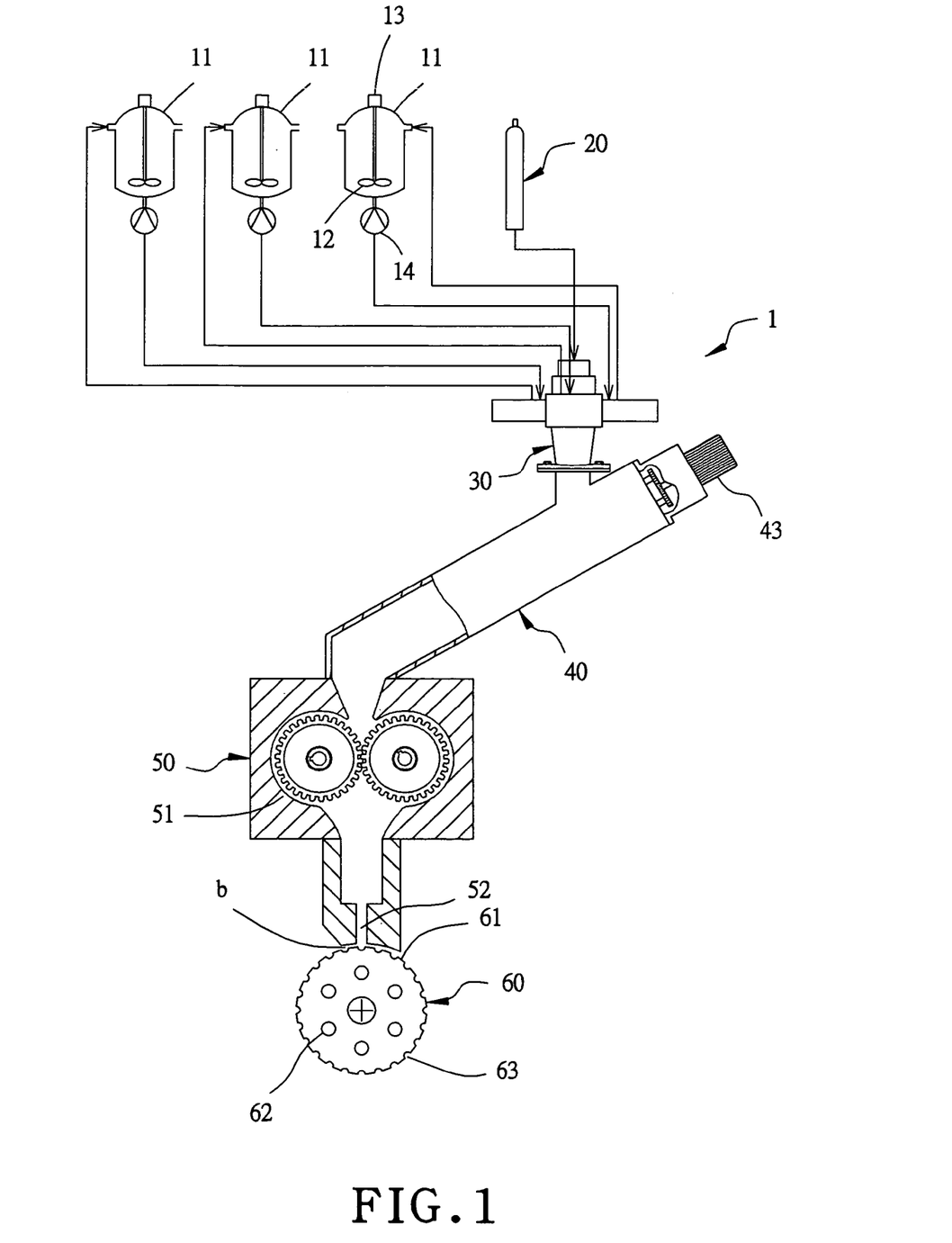
FIG. 1 is an assembly view of a polyurethane resin coating device in the present invention.
Figure 2:
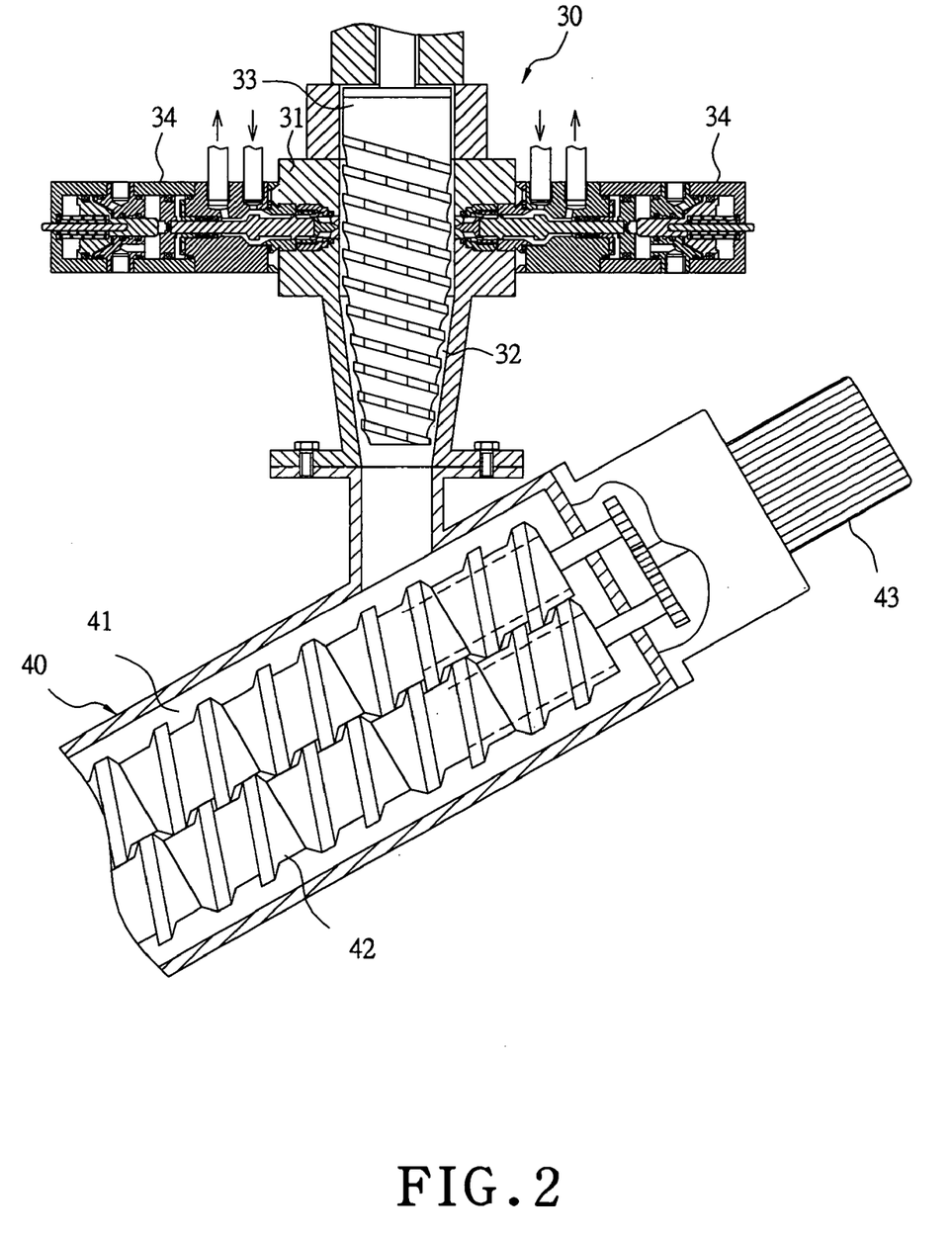
FIG. 2 is a partial cross-sectional view of material mixing unit and a pressuring unit of the polyurethane resin coating device in the present invention.
Figure 3:
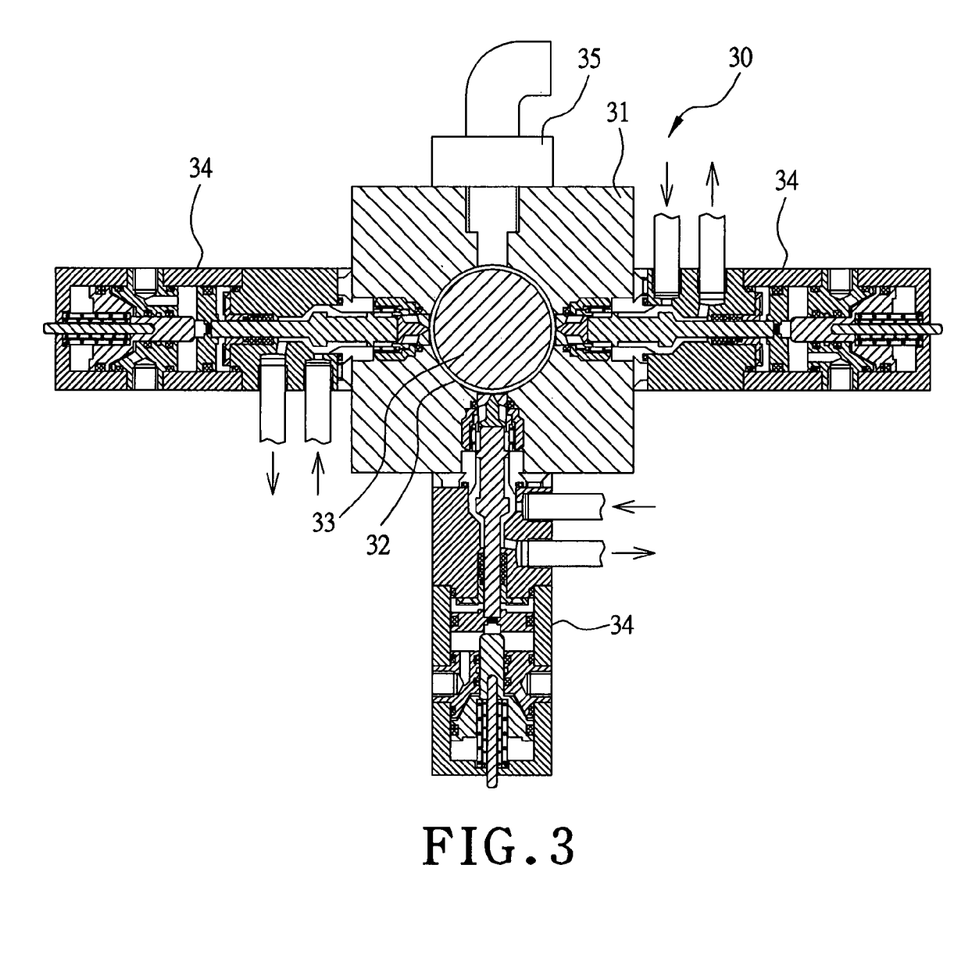
FIG. 3 is an upper cross-sectional view of the material mixing unit of the polyurethane resin coating device in the present invention.

A preferred embodiment of a polyurethane resin coating device 1 in the present invention, as shown in FIGS. 1, 2 and 3, includes a measuring-and-outputting unit 10, a foaming unit 20, a material mixing unit 30, an pressuring and sending unit 40, a gear pump 50 and a coating wheel 60 combined together.

The measuring-and-outputting unit 10 includes three material tanks 11 respectively filled therein with isocyanate polymer (PU resin for short) containing NCO, hydroxyl compound containing OH and pigment. The three material tanks 11 respectively have an agitator 12 disposed in the interior to be driven to operate by a motor 13 and a quantitative pump 14 installed at the underside for measuring and outputting the liquid material inside the material tanks 11.

The foaming unit 20 is filled therein with foaming agent for accelerating foaming action. The foaming agent could be nitrogen, gas, water or physical foaming agent.

The material mixing unit 30 is formed with a material mixing head 31 having its central portion bored with a longitudinal mixing groove 32 provided therein with a driving helical rod 33. The material mixing head 31 has its peripheral side provided with three material intake members 34 and a connecting member 35. The three material intake members 34 are respectively connected with the three material tanks 11 of the measuring-and-outputting unit 10 so that the liquid material in the three material tanks 11 can respectively be injected into the mixing groove 32 through the three material intake members 34. The connecting member 35 is connected with the foaming unit 20 so that the foaming agent in the foaming unit 20 can be guided and conveyed to the mixing groove 32 through the connecting member 35 to be mixed with the materials coming from the three material tanks 11 to react with each other instantaneously and form polyurethane resin liquid material (a), which then flows downward to the pressuring and sending unit 40.

The pressuring and sending unit 40 is formed with a pressuring chamber 41 communicating with the material mixing unit 30 for receiving the polyurethane resin liquid mixture (a) flowing from the material mixing unit 30. The pressuring chamber 41 is disposed in the interior with two parallel helical rods 42 to be driven by a speed-reducing motor 43 to mix the polyurethane resin liquid mixture (a) and then pressure it out of the pressuring chamber 41.

The gear pump 50 communicates with the pressuring unit 40 for receiving the polyurethane resin liquid mixture (a) coming from the extruding unit 40. Then, the polyurethane resin liquid mixture (a) is controlled by the rotating speed of the gears 51 in the gear pump 50 to flow outward with steady discharge through the outlet 52 of the gear pump 50.

Figure 4:
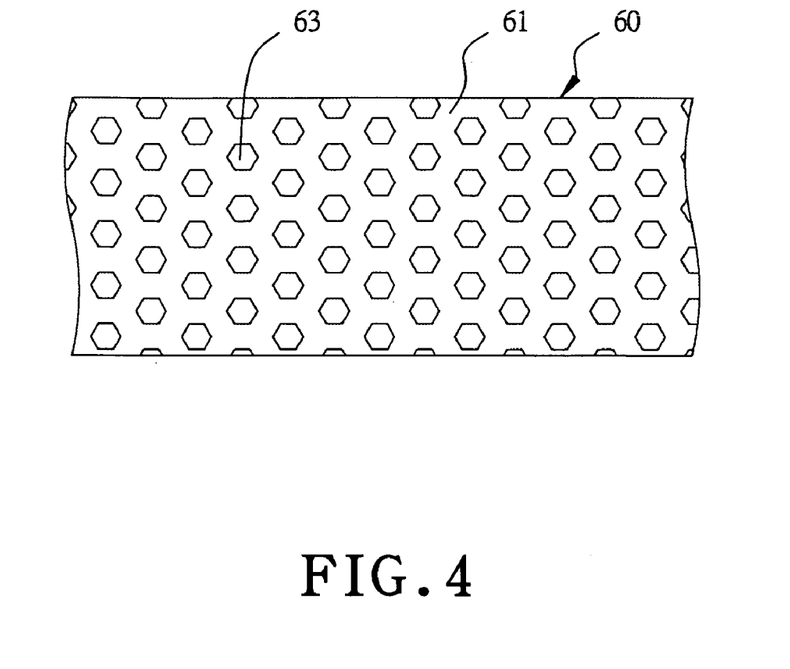
FIG. 4 is an upper view of the wheel surface of a coating wheel carved thereon with solid patterns in the present invention.

The coating wheel 60 is provided at the location of the outlet 52 of the gear pump 50, with a gap (b) adjustable in size formed between the wheel surface 61 of the coating wheel 60 and the outlet 52 of the gear pump 50. Thus, the wheel surface 61 of the coating wheel 60 can receive the polyurethane resin liquid mixture (a) flowing downward through the outlet 52 of the gear pump 50 and the gap (b) can be adjusted to control the coating thickness of the polyurethane resin liquid mixture (a). In this preferred embodiment, the gap (b) can be adjusted in size by shifting of the coating wheel 60 or the gear pump 50. Further, the coating wheel 60 is bored with plural cooling waterways 62 in the interior for pouring in circulatory cooling water for cooling off the polyurethane resin liquid material (a) received on the wheel surface 61 and congealing it into a half-hardened polyurethane resin layer (c). Furthermore, the wheel surface 61 of the coating wheel 60 is carved thereon with solid patterns 63 to form grain on a coated polyurethane resin layer, as shown in FIG. 4.

In operating, as shown in FIG. 1, firstly, the three material tanks 11 of the measuring-and-outputting unit 10 are respectively, filled therein with isocyanate polymer, hydroxyl compound and pigment, and the foaming unit 20 is filled with foaming agent. The isocyanate polymer, the hydroxyl compound, the pigment and the foaming agent are injected into the mixing groove 32 of the material mixing unit 30 respectively through the material intake members 34 and the connecting member 35 to be mixed and reacted therein to form polyurethane resin liquid material (a). Subsequently, the polyurethane resin liquid material (a) flows downward to the pressuring chamber 41 of the pressuring and sending unit 40 to be mixed and reacted again and then pressured and conveyed to the gear pump 50. Then, the polyurethane resin liquid material (a) is pushed by a comparatively great force of the gear pump 50 to flow out through the outlet 52 to be received by the wheel surface 61 of the coating wheel 60 and then cooled off and congealed into half-hardened polyurethane resin (c) (PU foamed material) for carrying out sequent coating work.

In the above-mentioned preferred embodiment, as shown in FIG. 1, the polyurethane resin liquid material (a) is mixed with both pigment and foaming agent. Substantially, for conforming to characteristics of products and demands of uses, a user could have option not to use pigment to form polyurethane resin (c) without special colors, or not to use foaming agent for carrying out foaming so as to form PU plastic.

Figure 5:
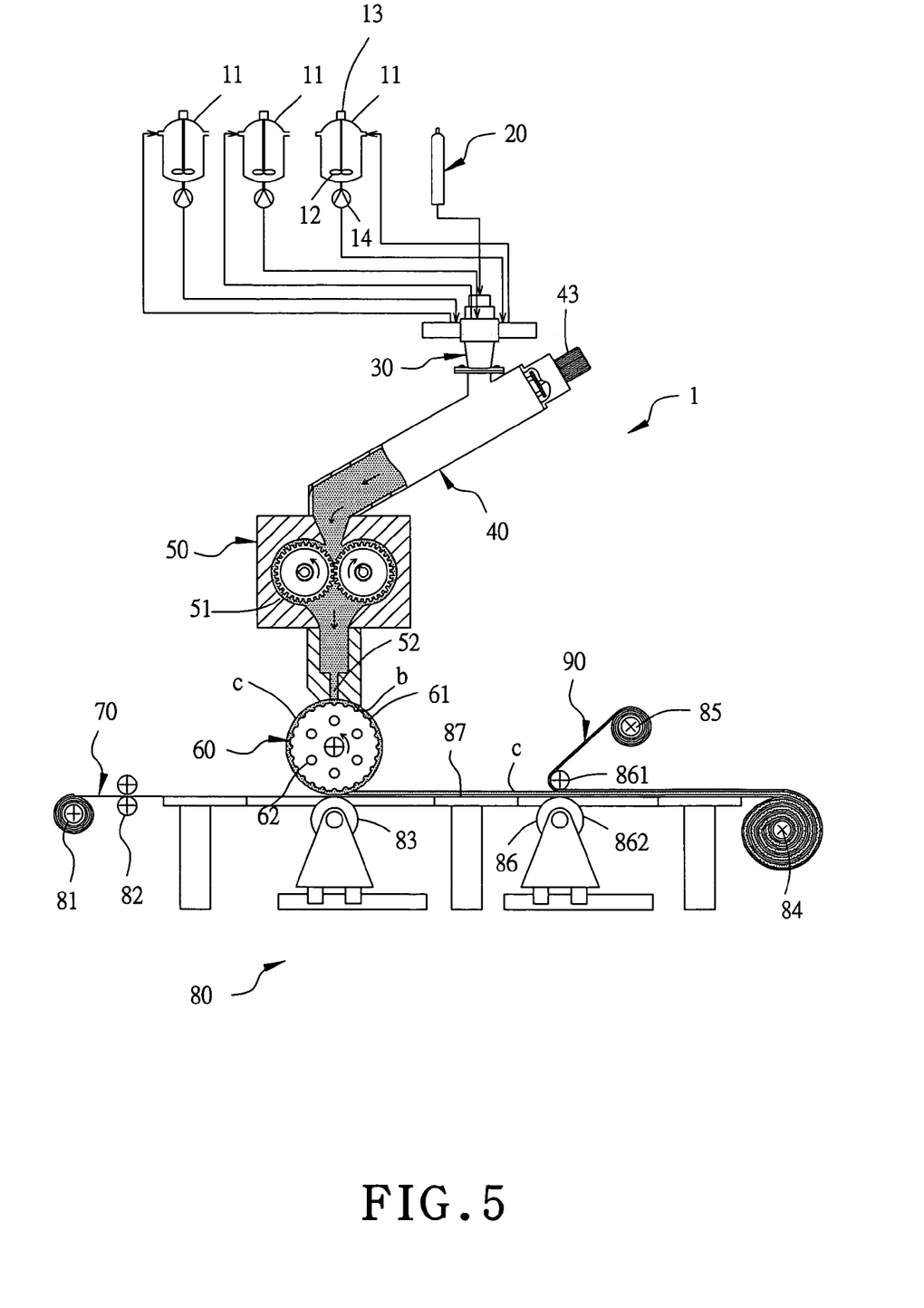
FIG. 5 is a cross-sectional view of the polyurethane resin coating device in a coating condition in the present invention.

Referring to FIG. 5, the polyurethane resin coating device 1 of this invention has three modes for carrying out coating and pasting as described below.

Figure 6:
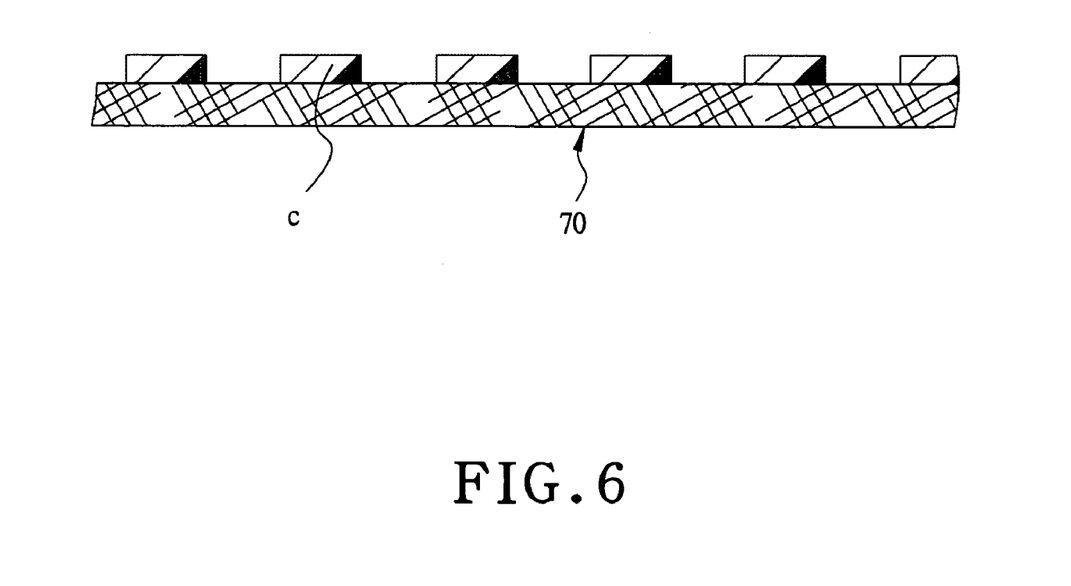
FIG. 6 is a partial cross-sectional view of a PU plastic layer pasted on a substratum cloth in the present invention.

1. Mode 1 is to have the half-hardened polyurethane resin (c) coated on the substratum cloth 70 with the help of a support device 80. The support device 80 is provided with a first releasing unit 81 for releasing and conveying the substratum cloth 70 to a location between a support wheel 83 and the coating wheel 60 through two conveying wheels 82, letting the half-hardened polyurethane resin (c) coated on the substratum cloth 70 to form a PU layer (or a PU foamed layer) thereon. Then, the substratum cloth 70 coated with a PU layer (or PU foamed layer), as shown in FIG. 6, is wound up by a winding unit 84. The substratum cloth 70 can be cloth, non-woven fabric, super fine fiber or the like.

Figure 7:
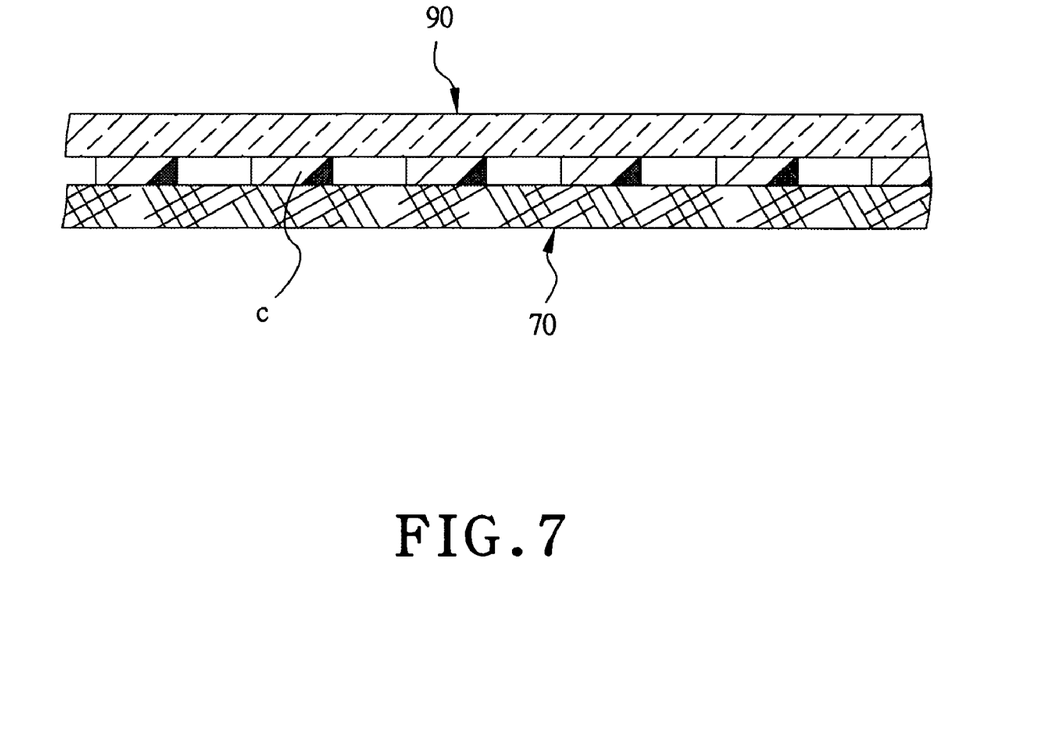
FIG. 7 is a partial cross-sectional view of the PU plastic layer and a skin membrane layer coated and pasted on the substratum cloth in the present invention.

2. Mode 2 is to have the half-hardened polyurethane resin (c) coated on the substratum cloth 70 and then pasted thereon with a skin membrane 90. After the substratum cloth 70 is coated with the polyurethane resin (c) through the process described in the first implementing mode, a waterproof membrane or a skin membrane 90 is released by a second releasing unit 85 and conveyed to the location between the upper roller 861 and the lower roller 862 of a rolling-and-pasting unit 86. Subsequently, the substratum cloth 70 coated with polyurethane resin (c) is moved through between the upper and the lower roller 861, 862 of the rolling-and-pasting unit 86 to let the skin membrane 90 rolled and pasted on the polyurethane resin (c) of the substratum cloth 70 by the upper and the lower roller 861, 862 and finally wound up by the winding unit 84, thus obtaining a substratum cloth 70 coated with a PU layer (or PU foamed layer) pasted thereon with the skin membrane 90, as shown in FIG. 7.

Figure 8:
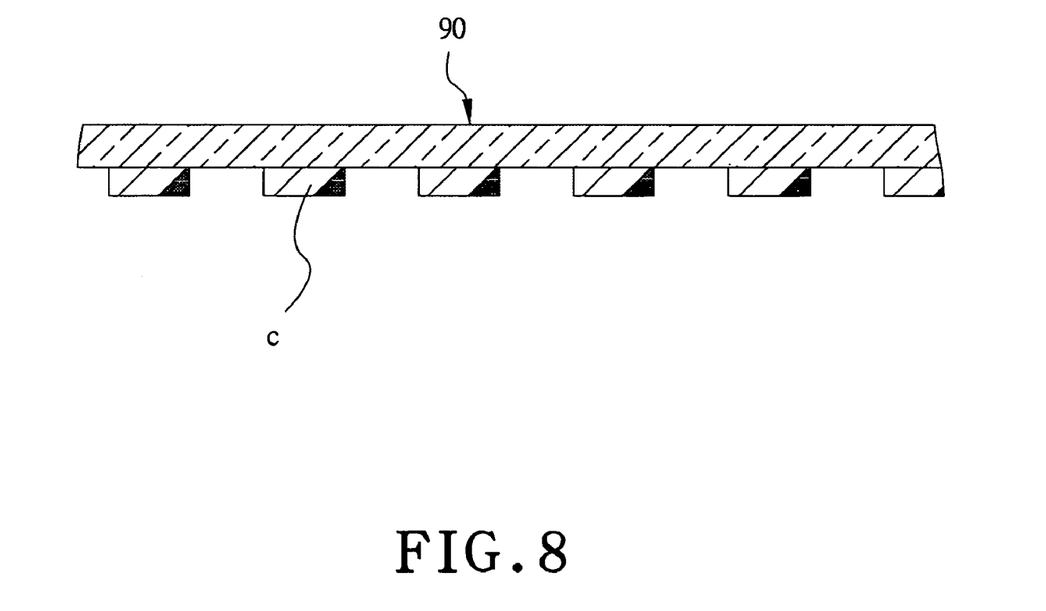
FIG. 8 is a partial cross-sectional view of the PU plastic layer pasted thereon with the skin membrane layer in the present invention.

3. Mode 3 is to have the skin membrane 90 directly pasted on the half-hardened polyurethane resin (c). The half-hardened polyurethane resin (c) is directly guided by a flat stand 87 or separable paper (not shown) to pass between the upper and the lower roller 861, 862 of the rolling-and-pasting unit 86 and pasted thereon with the skin membrane 90. Then, the polyurethane resin (c) pasted with the skin membrane 90 is wound up by the winding unit 84, thus obtaining a PU layer (or PU foamed layer) pasted thereon with the skin membrane 90, as shown in FIG. 8.

To sum up, this invention has the following advantages.

1. The coating device 1 is provided with the gear pump 50 communicating with the pressuring and sending unit 40 for strengthening and controlling the extruding force. Thus, after mixed and reacted in the extruding unit 40, the polyurethane resin liquid material (a) can be conveyed to the coating wheel 60 with proper flow, achieving an effect of steady and stable coating.

2. Between the outlet 52 of the gear pump 50 and the wheel surface 61 of the coating wheel 60 is formed the gap (b) adjustable in size; therefore, the half-hardened polyurethane resin (c) conveyed onto the coating wheel 60 can be controlled in thickness, and the coating amount and the coating thickness of the coating wheel 60 can also be controlled by adjusting the size of the gap (b).

3. The coating wheel 60 has its interior poured in with circulatory cooling water for cooling off the polyurethane resin liquid material (a) on the coating wheel 60 to have it congealed into half-hardened polyurethane resin (c) for facilitating next rolling and pasting work.

4. The coating wheel 60 has its surface carved with solid patterns 63 so that the polyurethane resin (c) coated and pasted on the substratum cloth 70 can produce striped or dotted grain, that is, a PU layer (or PU foamed layer) with striped or dotted grain can be formed on the substratum cloth 70.

5. By optionally adding pigment or foaming agent to the materials and through various modes of coating and pasting processes as described in foresaid preferred embodiment, the coating device 1 of this invention can produce various-type polyurethane resin membranes.

While the preferred embodiment of the invention has been described above, it will be recognized and understood that various modifications may be made therein and the appended claims are intended to cover all such modifications that may fall within the spirit and scope of the invention.

I claim:

1. A polyurethane resin coating device for coating a substrate comprising:
   a material mixing unit provided for receiving preset materials and carrying out mixing, said materials mixed and reacted to form polyurethane resin liquid mixture, said polyurethane resin liquid mixture flowing out downward;

a pressuring and sending unit formed with a pressuring chamber communicating with said material mixing unit, said pressuring and sending unit receiving said polyurethane resin liquid mixture flowing out of said material mixing unit, said pressuring chamber of said pressuring and sending unit installed with at least one rotary helical rod in the interior, said helical rod mixing said polyurethane resin liquid mixture again and then pressuring it out;

a gear pump communicating with said pressuring chamber of said pressuring and sending unit, said gear pump receiving said polyurethane resin liquid mixture pressured out of said pressuring and sending unit, said polyurethane resin liquid mixture controlled by a rotating speed of gears in said gear pump and conveyed outward with steady flow through an outlet of said gear pump; and a coating wheel provided at the location of said outlet of said gear pump, said coating wheel receiving said polyurethane resin liquid mixture flowing out of said gear pump through said outlet, a gap of proper size formed between the wheel surface of said coating wheel and said outlet of said gear pump, said gap adjustable in size for controlling a coating thickness of said polyurethane resin liquid mixture on said substrate, wherein said material mixing unit is formed with a material mixing head having its central portion bored with a longitudinal mixing groove provided therein with an actuating helical rod, said material mixing head having its peripheral side provided with plural material intake members and a connecting member, specific materials injected in said mixing groove through said material intake members and said connecting member.

2. The polyurethane resin coating device as claimed in claim 1, wherein said material mixing unit is connected with a measuring-and-outputting unit having three material tanks, said three material tanks respectively filled therein with isocyanate polymer containing NCO, hydroxyl compound containing OH and pigment, said three material tanks respectively provided in the interior with an agitator driven by a motor, said three material tanks respectively provided with a quantitative pump at the underside, said quantitative pump injecting liquid materials in said material tanks into said mixing groove of said material mixing unit through said material intake members.

3. The polyurethane resin coating device as claimed in claim 1, wherein said wheel surface of said coating wheel is formed with solid grain.

4. The polyurethane resin coating device as claimed in claim 1, wherein said coating wheel is poured in with circulatory cooling water for cooling off said polyurethane resin liquid mixture on said wheel surface.

5. A polyurethane resin coating device for coating a substrate comprising:

a material mixing unit provided for receiving preset materials and carrying out mixing, said materials mixed and reacted to form polyurethane resin liquid mixture, said polyurethane resin liquid mixture flowing out downward;

a pressuring and sending unit formed with a pressuring chamber communicating with said material mixing unit, said pressuring and sending unit receiving said polyurethane resin liquid mixture flowing out of said material mixing unit, said pressuring chamber of said pressuring and sending unit installed with at least one rotary helical rod in the interior, said helical rod mixing said polyurethane resin liquid mixture again and then pressuring it out;

a gear pump communicating with said pressuring chamber of said pressuring and sending unit, said gear pump receiving said polyurethane resin liquid mixture pressured out of said pressuring and sending unit, said polyurethane resin liquid mixture controlled by a rotating speed of gears in said gear pump and conveyed outward with steady flow through an outlet of said gear pump; and a coating wheel provided at the location of said outlet of said gear pump, said coating wheel receiving said polyurethane resin liquid mixture flowing out of said gear pump through said outlet, a gap of proper size formed between the wheel surface of said coating wheel and said outlet of said gear pump, said gap adjustable in size for controlling a coating thickness of said polyurethane resin liquid mixture on said substrate, wherein said material mixing unit is connected with a foaming unit filled therein with foaming agent for accelerating foaming action, said foaming agent being nitrogen, gas, water or physical foaming agent.

6. A polyurethane resin coating device for coating a substrate comprising:

a material mixing unit provided for receiving preset materials and carrying out mixing, said materials mixed and reacted to form polyurethane resin liquid mixture, said polyurethane resin liquid mixture flowing out downward;

a pressuring and sending unit formed with a pressuring chamber communicating with said material mixing unit, said pressuring and sending unit receiving said polyurethane resin liquid mixture flowing out of said material mixing unit, said pressuring chamber of said pressuring and sending unit installed with at least one rotary helical rod in the interior, said helical rod mixing said polyurethane resin liquid mixture again and then pressuring it out;

a gear pump communicating with said pressuring chamber of said pressuring and sending unit, said gear pump receiving said polyurethane resin liquid mixture pressured out of said pressuring and sending unit, said polyurethane resin liquid mixture controlled by a rotating speed of gears in said gear pump and conveyed outward with steady flow through an outlet of said gear pump; and a coating wheel provided at the location of said outlet of said gear pump, said coating wheel receiving said polyurethane resin liquid mixture flowing out of said gear pump through said outlet, a gap of proper size formed between the wheel surface of said coating wheel and said outlet of said gear pump, said gap adjustable in size for controlling a coating thickness of said polyurethane resin liquid mixture on said substrate, wherein said pressuring chamber of said pressuring and sending unit is installed in the interior with two parallel helical rods driven by a speed-reducing motor for mixing and pressuring said polyurethane resin liquid mixture.

7. A polyurethane resin coating device for coating a substrate comprising:

a material mixing unit provided for receiving preset materials and carrying out mixing, said materials mixed and reacted to form polyurethane resin liquid mixture, said polyurethane resin liquid mixture flowing out downward;

a pressuring and sending unit formed with a pressuring chamber communicating with said material mixing unit, said pressuring and sending unit receiving said polyurethane resin liquid mixture flowing out of said material mixing unit, said pressuring chamber of said pressuring and sending unit installed with at least one rotary helical rod in the interior, said helical rod mixing said polyurethane resin liquid mixture again and then pressuring it out;

a gear pump communicating with said pressuring chamber of said pressuring and sending unit, said gear pump receiving said polyurethane resin liquid mixture pressured out of said pressuring and sending unit, said polyurethane resin liquid mixture controlled by a rotating speed of gears in said gear pump and conveyed outward with steady flow through an outlet of said gear pump; and a coating wheel provided at the location of said outlet of said gear pump, said coating wheel receiving said polyurethane resin liquid mixture flowing out of said gear pump through said outlet, a gap of proper size formed between the wheel surface of said coating wheel and said outlet of said gear pump, said gap adjustable in size for controlling a coating thickness of said polyurethane resin liquid mixture on said substrate, wherein said gear pump can be shifted for controlling the size of said gap formed between said outlet of said gear pump and said wheel surface of said coating wheel.

8. A polyurethane resin coating device for coating a substrate comprising:

a material mixing unit provided for receiving preset materials and carrying out mixing, said materials mixed and reacted to form polyurethane resin liquid mixture, said polyurethane resin liquid mixture flowing out downward;

a pressuring and sending unit formed with a pressuring chamber communicating with said material mixing unit, said pressuring and sending unit receiving said polyurethane resin liquid mixture flowing out of said material mixing unit, said pressuring chamber of said pressuring and sending unit installed with at least one rotary helical rod in the interior, said helical rod mixing said polyurethane resin liquid mixture again and then pressuring it out;

a gear pump communicating with said pressuring chamber of said pressuring and sending unit, said gear pump receiving said polyurethane resin liquid mixture pressured out of said pressuring and sending unit, said polyurethane resin liquid mixture controlled by a rotating speed of gears in said gear pump and conveyed outward with steady flow through an outlet of said gear pump; and a coating wheel provided at the location of said outlet of said gear pump, said coating wheel receiving said polyurethane resin liquid mixture flowing out of said gear pump through said outlet, a gap of proper size formed between the wheel surface of said coating wheel and said outlet of said gear pump, said gap adjustable in size for controlling a coating thickness of said polyurethane resin liquid mixture on said substrate, wherein said coating wheel can be shifted for controlling the size of said gap formed between said wheel surface of said coating wheel and said outlet of said gear pump.

* * * * *